(12) United States Patent
Sakashita et al.

(10) Patent No.: US 6,640,589 B1
(45) Date of Patent: Nov. 4, 2003

(54) GLASS BASE MATERIAL DRAWING APPARATUS AND METHOD FOR DRAWING GLASS BASE MATERIAL

(75) Inventors: Mitsukuni Sakashita, Annaka (JP);
Shoji Hoshino, Annaka (JP);
Tadakatsu Shimada, Annaka (JP);
Waichi Yamamura, Annaka (JP);
Hideo Hirasawa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 345 days.

(21) Appl. No.: 09/714,874

(22) Filed: Nov. 17, 2000

Related U.S. Application Data

(63) Continuation-in-part of application No. 09/192,572, filed on Nov. 17, 1998, now abandoned.

(30) Foreign Application Priority Data

Nov. 17, 1997 (JP) .......................................... H9-315117

(51) Int. Cl.$^7$ ............................................. C03B 37/025
(52) U.S. Cl. ............................ 65/435; 65/477; 65/482; 65/500; 65/537; 65/540
(58) Field of Search .......................... 65/500, 533, 535, 65/537, 540, 435, 477, 475, 482; 264/1.24, 164, 288.4, 291, 479; 425/66; 373/28

(56) References Cited

U.S. PATENT DOCUMENTS

| | | |
|---|---|---|
| 2,465,283 A | 3/1949 | Schlehr |
| 2,495,956 A | 1/1950 | Cook |
| 2,968,622 A | 1/1961 | Whitehurst |
| 3,177,057 A | 4/1965 | Potter et al. |
| 3,387,958 A | 6/1968 | Day et al. |
| 3,628,931 A | 12/1971 | Russell |
| 3,690,853 A | 9/1972 | Law |
| 3,897,234 A | 7/1975 | Froberg |
| 4,552,576 A | 11/1985 | Hara et al. |

FOREIGN PATENT DOCUMENTS

| | | |
|---|---|---|
| DE | 3929894 A1 | 3/1991 |
| JP | 63-242938 | 10/1988 |
| JP | 5-781399 | 3/1993 |
| JP | 6-199536 | 7/1994 |

OTHER PUBLICATIONS

Kobayashi et al., "Optical Fiber Drawing Furnace", Japanese Patent Office Patent Journal, Kokai Patent Appln. No.: HEI 6[1994]–199536, Jul. 19, 1994, pp. 1–28.

*Primary Examiner*—Sean Vincent
(74) *Attorney, Agent, or Firm*—Pillsbury Winthrop LLP

(57) ABSTRACT

The glass base material drawing apparatus for heating and drawing a glass base material has a storage unit for storing the glass base material having an opening unit that is opened along the longitudinal direction of the storage unit when the glass base material is placed inside the storage unit, a heating unit for heating the glass base material that has been stored inside the storage unit via the opening unit, and a pull-out unit for pulling out the glass base material heated by the heating unit. The opening unit may be opened in such a manner that the glass base material is moved from a side direction of the storage unit into the interior of the storage unit. A main axis for supporting the glass base material is connected to the glass base material. The storage unit may have a penetration hole through which the main axis is inserted when the opening unit is closed.

38 Claims, 14 Drawing Sheets

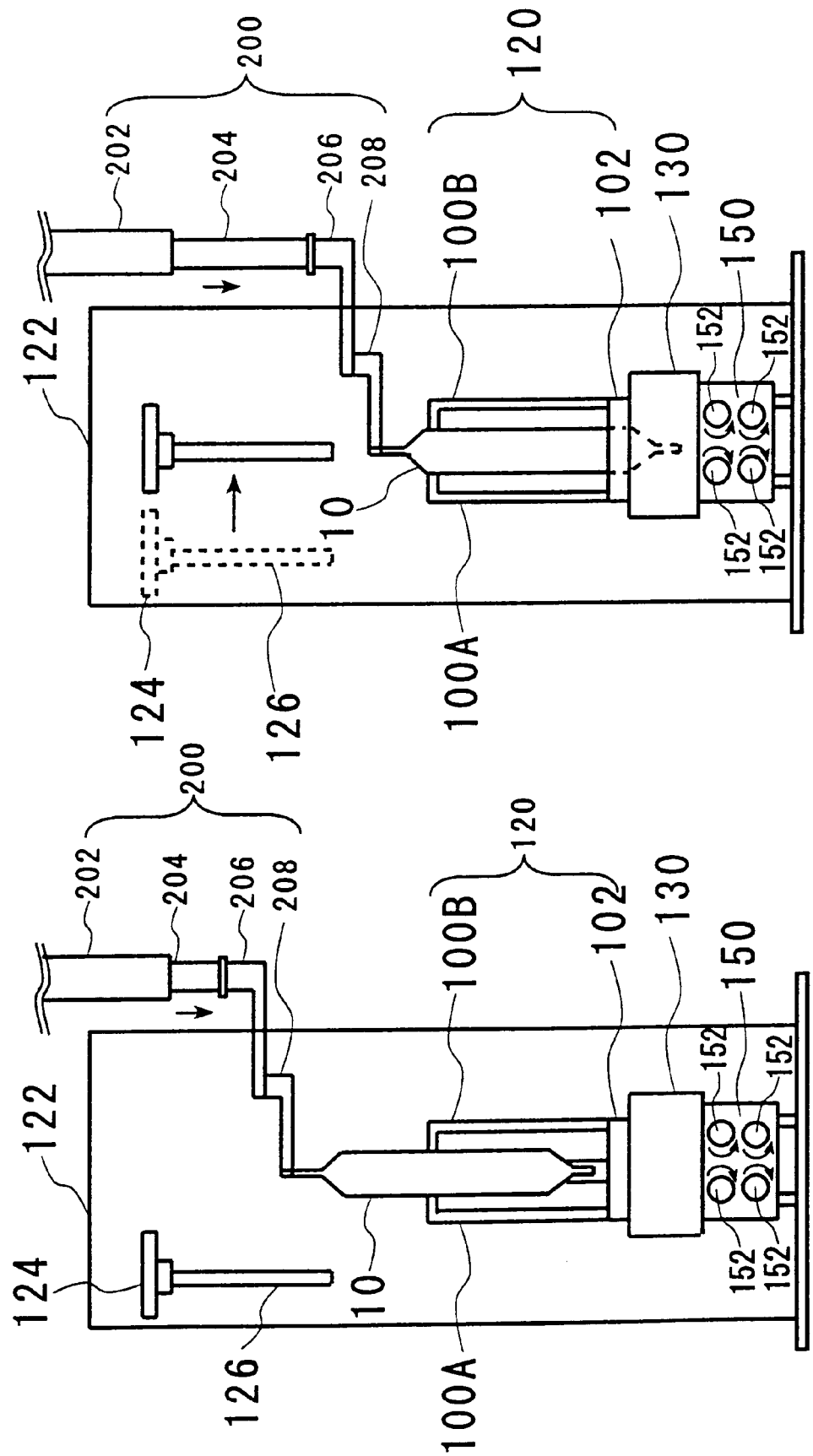

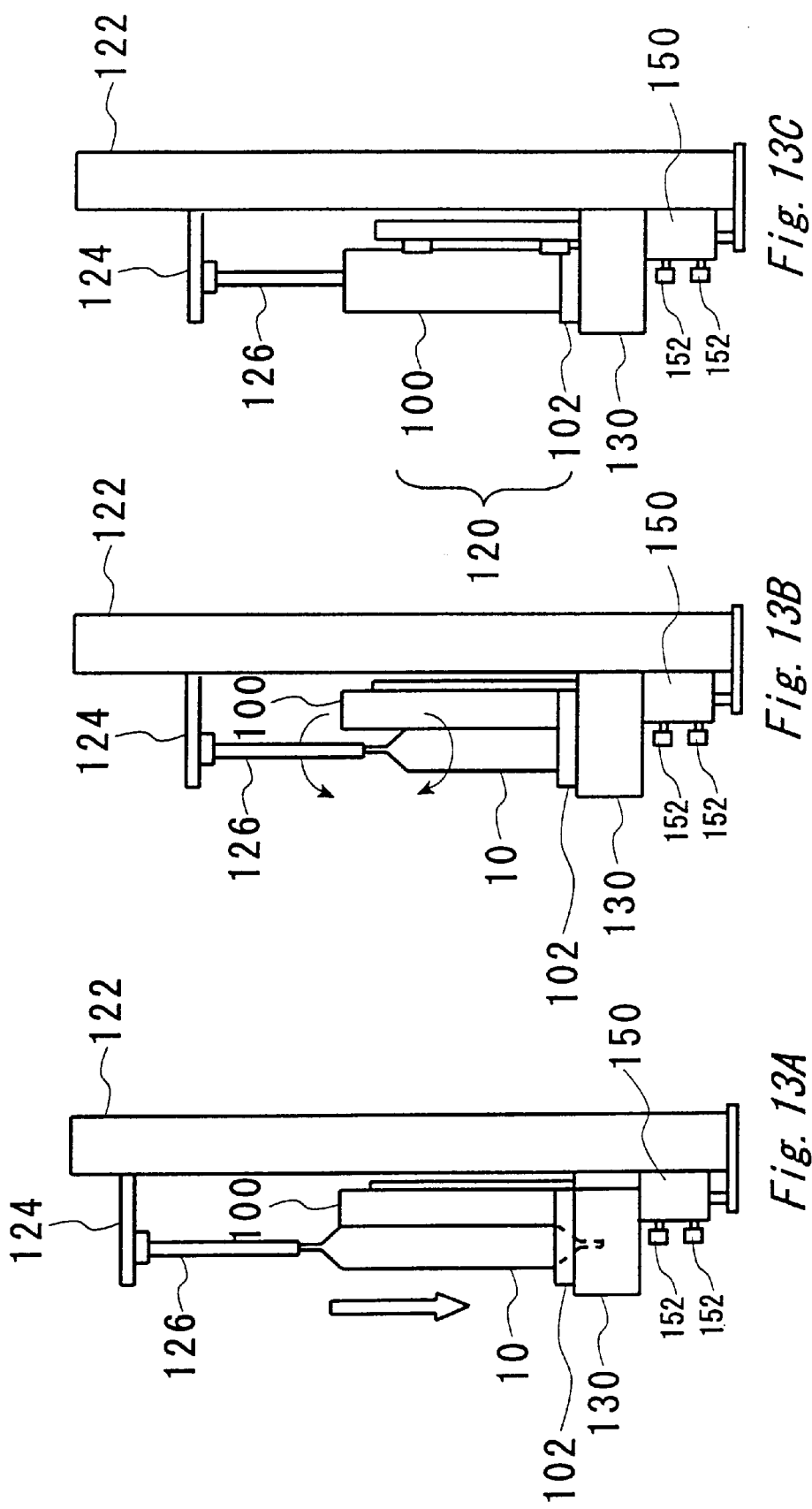

GLASS BASE MATERIAL DRAWING APPARATUS AND METHOD FOR DRAWING GLASS BASE MATERIAL

CROSS REFERENCE TO RELATED APPLICATIONS

This is a continuation-in-part of U.S. Patent Application Ser. No. 09/192,572 filed Nov. 17, 1998 now abandoned, which claims priority to Japanese Application No. H9-315117, filed Nov. 17, 1997, the complete disclosures of which are incorporated in their entirety herein by reference.

BACKGROUND OF THE INVENTION

1. Field of the Invention

The present invention relates to a glass base material drawing apparatus which draws a glass rod. More particularly the glass base material drawing apparatus is capable of drawing a glass rod until the outside diameter of the glass rod reaches a prescribed value to obtain a glass rod having a prescribed diameter (for example, an optical fiber base material).

2. Description of the Related Art

FIG. 1 is a schematic drawing of the neighborhood of a heating furnace of a glass base material drawing apparatus nearby according to the prior art When an optical fiber base material is drawn until the diameter of the optical fiber base material reaches a desired value, it is necessary to prevent foreign materials in the air from adhering to the pre-drawn glass base material 11 before the pre-drawn glass base material 11 is placed in a heating furnace 13. In order to achieve this objective, the glass base material 11 must be held in a storing container 12 before the glass base material 11 is placed in the heating furnace 13. In the prior art, a cylindrical container as shown in FIG. 3 was used as a storing container, and the cylindrical container was kept airtight by closing the top of the storing container 12 with a lid 16.

When the conventional cylindrical container 12 is used, however, the glass base material 11 needs to be shifted temporarily upward above the storing container 12 in order to install the glass base material 11 to the drawing apparatus. For this reason, the glass base material drawing apparatus is made very large. As the size of the glass base material 11 is increased, the size of the storing container is also increased. As a result, the size of the drawing apparatus is also increased. Therefore, the operation efficiency of the drawing apparatus deteriorates.

SUMMARY OF THE INVENTION

Given this problem, it is an object of the present invention to provide a method for drawing a glass base material and a glass base material drawing apparatus which solve the above-state problem.

According to the first aspect of the present invention, a glass base material drawing apparatus for heating and drawing a glass base material is provided. This glass base material drawing apparatus has a storage unit for storing the glass base material having an opening unit that is opened along the longitudinal direction of the storage unit when the glass base material is placed inside the storage unit, a heating unit for heating the glass base material that has been stored inside the storage unit via the opening unit, and a pull-out unit for pulling out the glass base material heated by the heating unit.

The opening unit may be opened in such a manner that the glass base material is moved from a side direction of the storage unit into the interior of the storage unit. A main axis for supporting the glass base material is connected to the glass base material. The storage unit may have a penetration hole through which the main axis is inserted when the opening unit is closed.

The opening unit may be opened in such a manner that the main axis is installable from a side direction of the storage unit to a position that passes through the penetration hole. When the opening unit is opened, at least a portion of the circumference of the penetration hole may be opened. The storage unit may have, for example, a cylindrical pipe unit and an end surface formed on the top surface of the pipe unit. The opening unit may be formed at the center of the end surface.

The storage unit is divisible into two or more sub-storage units along the axial direction of the storage unit. The opening unit may be opened by moving at least one of the sub-storage units away from the remaining sub-storage units. The storage unit may further have hinges which couple the two or more sub-storage units with each other. The storage unit may be divisible into two sub-storage units by a plane that passes through the axis of the storage unit.

BRIEF DESCRIPTION OF THE DRAWINGS

FIG. 12A and FIG. 12B show a drawing procedure when a glass base rod is moved inside a storage unit.

FIG. 13A and FIG. 13B show a side view of a glass base rod drawing apparatus.

DETAILED DESCRIPTION OF THE INVENTION

Figure 2:
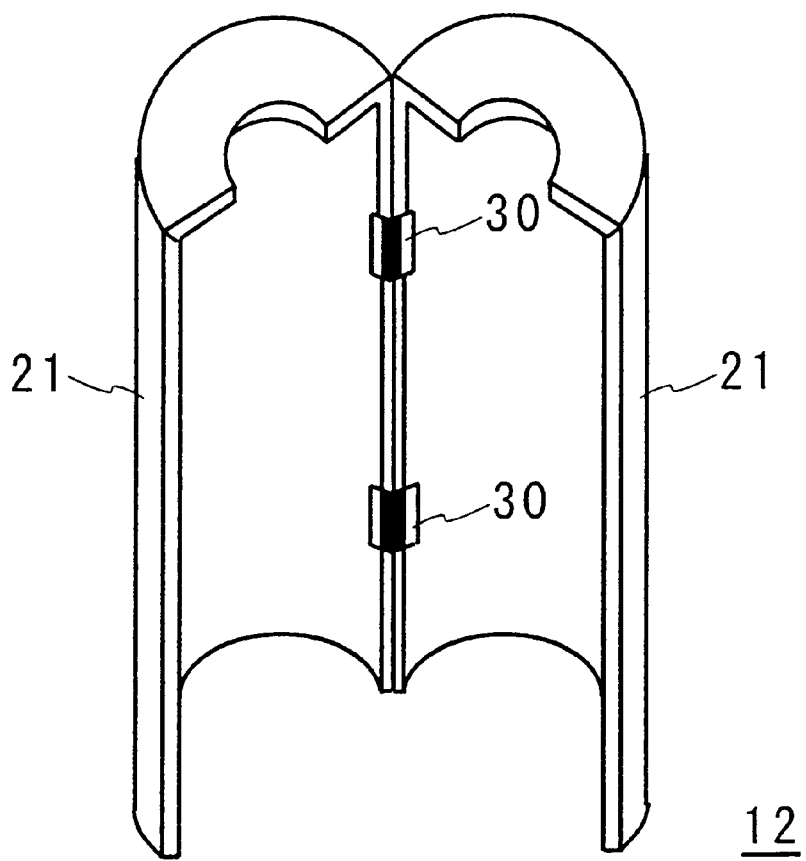
FIG. 2 is an oblique view of an example of a storing container of a glass base material drawing apparatus according to the present invention.

FIG. 2 shows an example of a storing container 12 installed in a glass base material drawing apparatus according to the present invention. Storing container 12 can be constructed as follows. First, a cylinder is cut vertically into two identical half-cylinders 21 along a plane containing the central axis of the cylinder. The two half-cylinders 21 are then connected with hinges 30 as shown in FIG. 2. Hence, the resultant storage container 12 can be opened or closed freely.

When a glass base material 11 is installed on the drawing apparatus, the storage container 12 is opened to store the glass base material 11 in the storage container 12 from a side direction. Once the glass base material 11 is stored inside the storage container 12, the storage container 12 is closed. Thus, the storage container 12 is kept airtight.

As a result, the glass base material 11 does not need to be shifted upward to the top portion of the storage container 12 when the glass base material 11 is installed. Therefore, the shift distance of the glass base material 11 can be reduced in installing the glass base material 11. As a result, the height of the drawing apparatus can be reduced in comparison with the conventional storing container that cannot be opened or closed.

The above-described storage container 12 is divided into two parts. However, the storage container 12 may be divided into three or more parts. It is desirable to divide the storage container 12 into two to four parts to manufacture and operate the storage container 12 easily. It is also desirable to divide the storage container 12 along the longitudinal direction.

The storage container 12 can be made of a conventional material. However, it is desirable that the storage container 12 be made of stainless steel or the like to make the storage container 12 heat resistant. It is also desirable that the storage container 12 be completely sealed with hinges so that dust will not be generated when the storage container 12 is opened or closed.

In addition to the storage container 12, the glass base material drawing apparatus according to the present invention has a heating furnace 13 which heats and softens a glass base material 11, a supply mechanism 17 which supplies a glass base material 11, and a pullout mechanism 6 for pulling out the glass base material 11 heated by the heating furnace 13.

Figure 5:
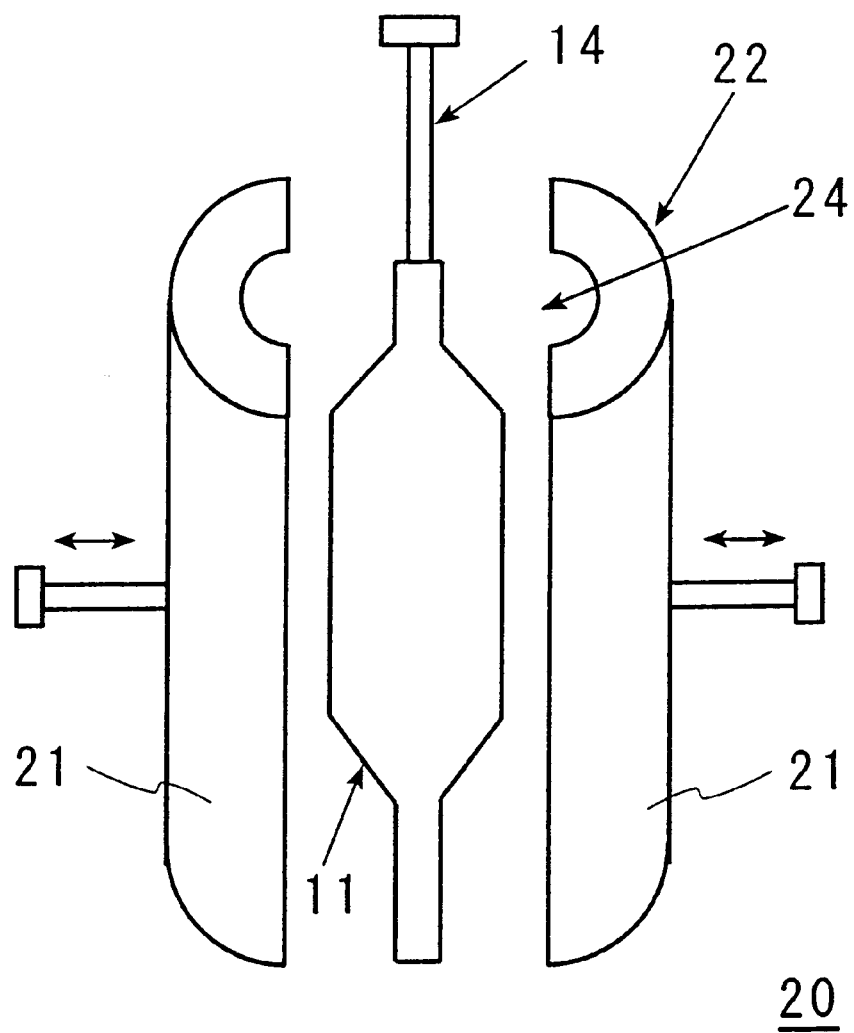
FIG. 5 shows the structure of a storage unit 12 in another embodiment according to the present invention.

FIG. 5 shows the structure of a storage unit 12 in another embodiment of the present invention. The storage unit 12 is divided into two half-cylinder units 21. When the storage unit 12 has a cylindrical shape the two half-cylinder units 21 are closed. A circular penetration hole 24 is formed at the center of the top surface 22 of the storage unit 12. By moving one of the two half-cylinder units 21 away from the other of the two half-cylinder units 21 or by moving the two half-cylinder units 21 away from each other, the main axis 14 and the glass base material 11 can be installed from a side direction of the storage unit 12 into the interior of the storage unit 12. After this, by closing the two half-cylinder units 21, the glass base material 11 and the main axis 14 can be stored inside the storage unit 12.

Figures 6A, 6B:
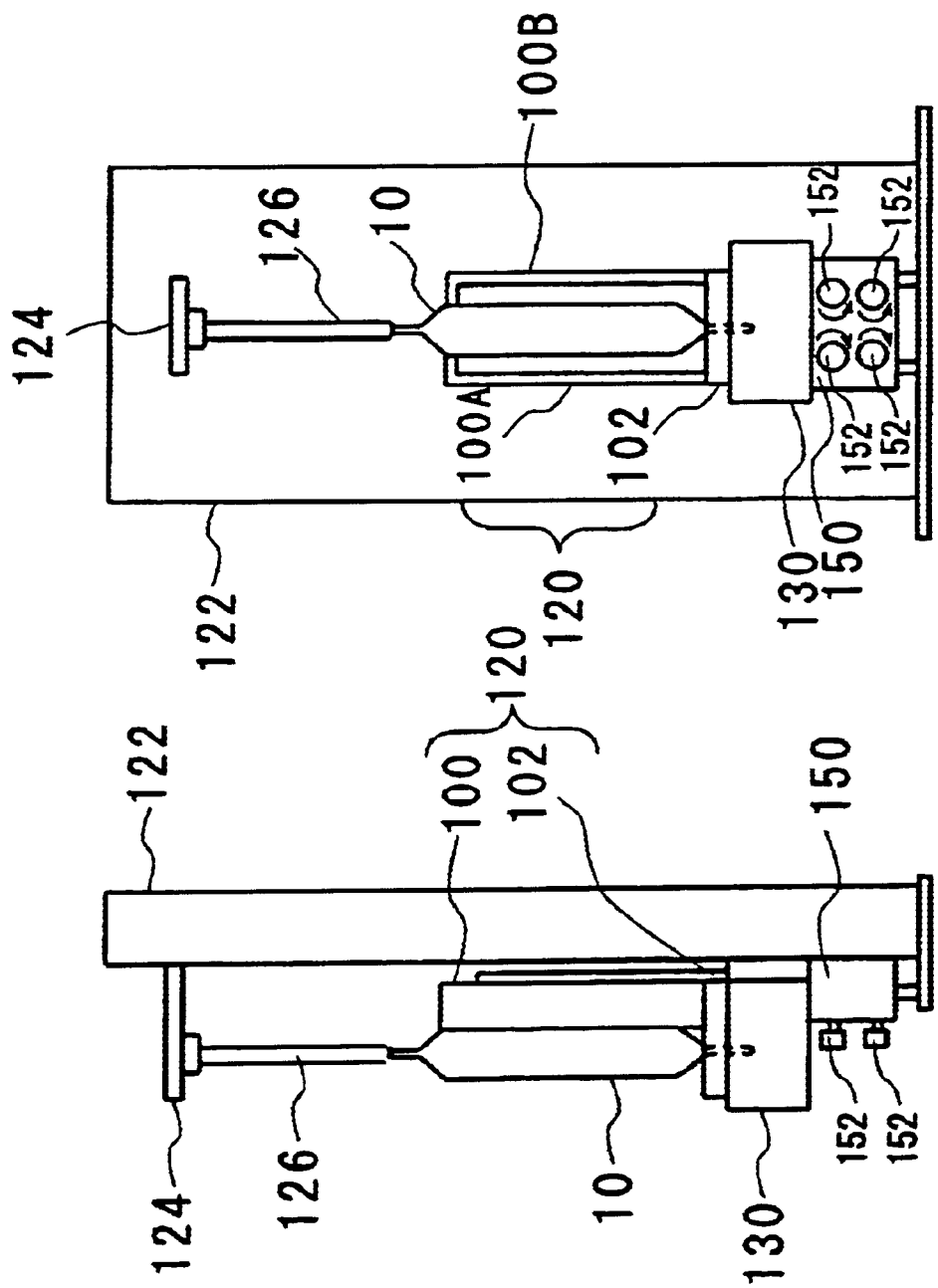
FIG. 6A and FIG. 6B show another embodiment of a glass base rod drawing apparatus according to the present invention.

FIG. 6A and FIG. 6B show another embodiment of a glass base rod drawing apparatus of the present invention. The glass base rod has a frame 122, a supply mechanism 124, a main shaft 126, a storage unit 120, a heating unit 130, and an extraction unit 150. The supply mechanism 124, the storage unit 120, the heating unit 130, and the extraction unit 150 are installed on the frame 122.

The supply mechanism 124 supplies the glass base rod 10 to the storage unit 120. The supply mechanism 124 includes a main shaft 126 for supporting the glass bass rod 10. One end of the main shaft 126 is connected to the glass base rod 126, and the other end of the main shaft is connected to the supply mechanism 124. The supply mechanism 124 supplies the glass base rod 10 to the storage unit 120 by lowering the main shaft 126, on which the glass base rod 10 is connected, to the storage unit 120. The supply mechanism 124 has a mechanism for moving the main shaft 126 in a horizontal direction in relation to a substantially central position of the storage unit 10 during the installation of the glass base rod 10 into the interior of the storage unit 120.

The storage unit 120 stores the glass base rod 10 whereby the longitudinal axis of the glass base rod 10 is vertically aligned. The storage unit 120 has an opening unit 100, from which the glass base rod 10 is installed inside the storage unit 120, and a sub-storage unit 102, which is provided below the opening unit 100. The opening unit 100 is an upper part of the storage unit 120, and the sub-storage unit 102 is a lower part of the storage unit 120. The opening unit 100 is opened along a longitudinal direction and a vertical direction of the storage unit 120 when the glass base rod 10 is installed inside the storage unit 120. The opening unit 100 is in an open position in FIG. 6A and FIG. 6B. Compared to opening unit 100, the form of sub-storage unit 102 does not change.

The heating unit 130 heats a lower end portion of the glass base rod 10 that has been stored inside the storage unit 120 via the opening unit 100. The extraction unit 150 has two pairs of rollers 152 that extract arid elongate the glass base rod 10 that has been heated by the heating unit 130 to reduce the diameter of the heated glass base rod to produce a preform. A preform is a base material for manufacturing a glass fiber.

Figure 7:
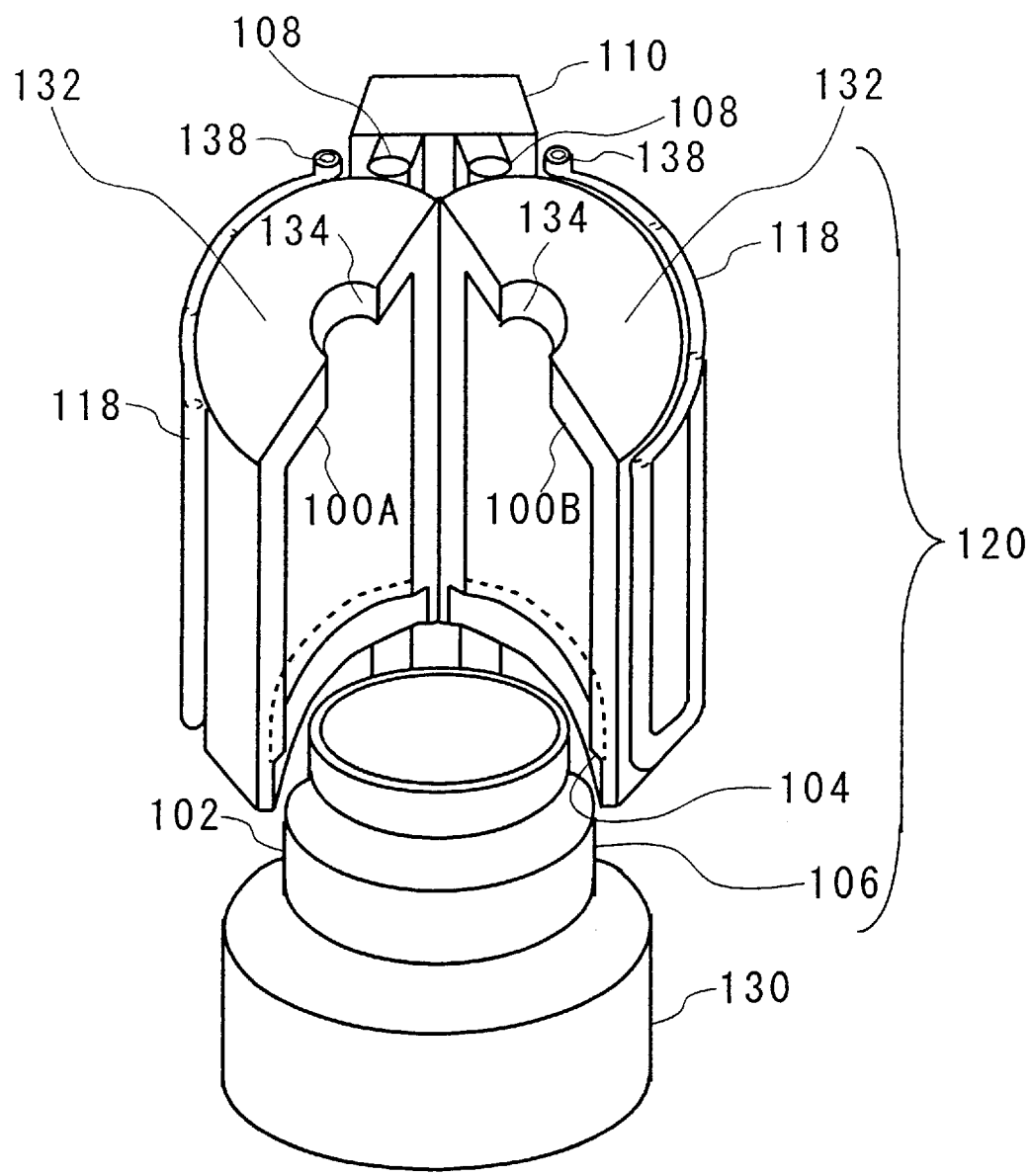
FIG. 7 shows a detailed perspective view of the storage unit in the embodiment shown in FIG. 6.

FIG. 7 shows a detailed perspective view of the storage unit 120 of the present embodiment shown in FIG. 6. The opening unit 100 is piped shaped, such as a cylinder-shape, as shown in FIG. 7. The opening unit 100 has an end surface 132 formed on a top surface of the opening unit 100. A penetration hole 134 is formed at a center of the end surface 132 of the opening unit 100. The opening unit 100 is divided into two sub-opening units 100A and 100B along an axis of the storage unit 120. More precisely, the opening unit 100 is divided into two sub-opening units 100A and 100B by a plane that passes through the axis of the storage unit 120.

Moving one of the sub-opening units 100A or 100B away from the other sub-opening unit 100A or 100B opens the opening unit 100. The opening unit 100 has hinges 108 for coupling two sub-opening units 100A and 100B together. In FIG. 7, each sub-opening unit 100A and 100B are connected to each of the corresponding hinges 108. A hinge supporter 110 supports each hinge 108. The sub-opening units 100A and 100B can also be connected to one hinge. The opening unit 100 is opened so as to install the glass base rod 10 into the storage unit 120 by moving the glass base rod 10 from a side direction of the storage unit 120 into an interior of the storage unit 120.

The storage unit 120 can be made of a conventional material. However, it is preferable to make the storage unit 110 with stainless steel or the like in order to make the storage unit 120 heat resistant.

Each of the sub-opening units 100A and 100B has a cooling jacket 118, through which coolant flows for cooling the opening unit 100. The cooling jacket 118 is a pipe provided on the outside surface of the opening unit 100. The cooling jacket 118 is provided to each sub-opening unit 100A and 100B such that the netlike cooling jacket 118 substantially surrounds a whole outside surface on the surface of the sub-opening unit 100A or 100B.

Because the storage unit 120 is provided on the heating unit 130, the temperature of the storage unit 120 increases during the glass base rod drawing process. Therefore, the opening unit 100 must be cooled so that the opening unit 100 can be manually opened. A coolant inlet 138 of the cooling jacket 118 is located in the vicinity of the hinges 108 where the amount of inlet 138 movement is the least during opening and closing of the opening unit 100.

The opening unit 100 is vertically separated from the sub-storage unit 102 around the entire circumference of the storage unit 120. The cross section of the bottom end 104 of each of the sub-opening units 100A and 100B are stepped in shape. The cross section of the upper end of the sub-storage unit 102 is also stepped in shape.

Figure 8:
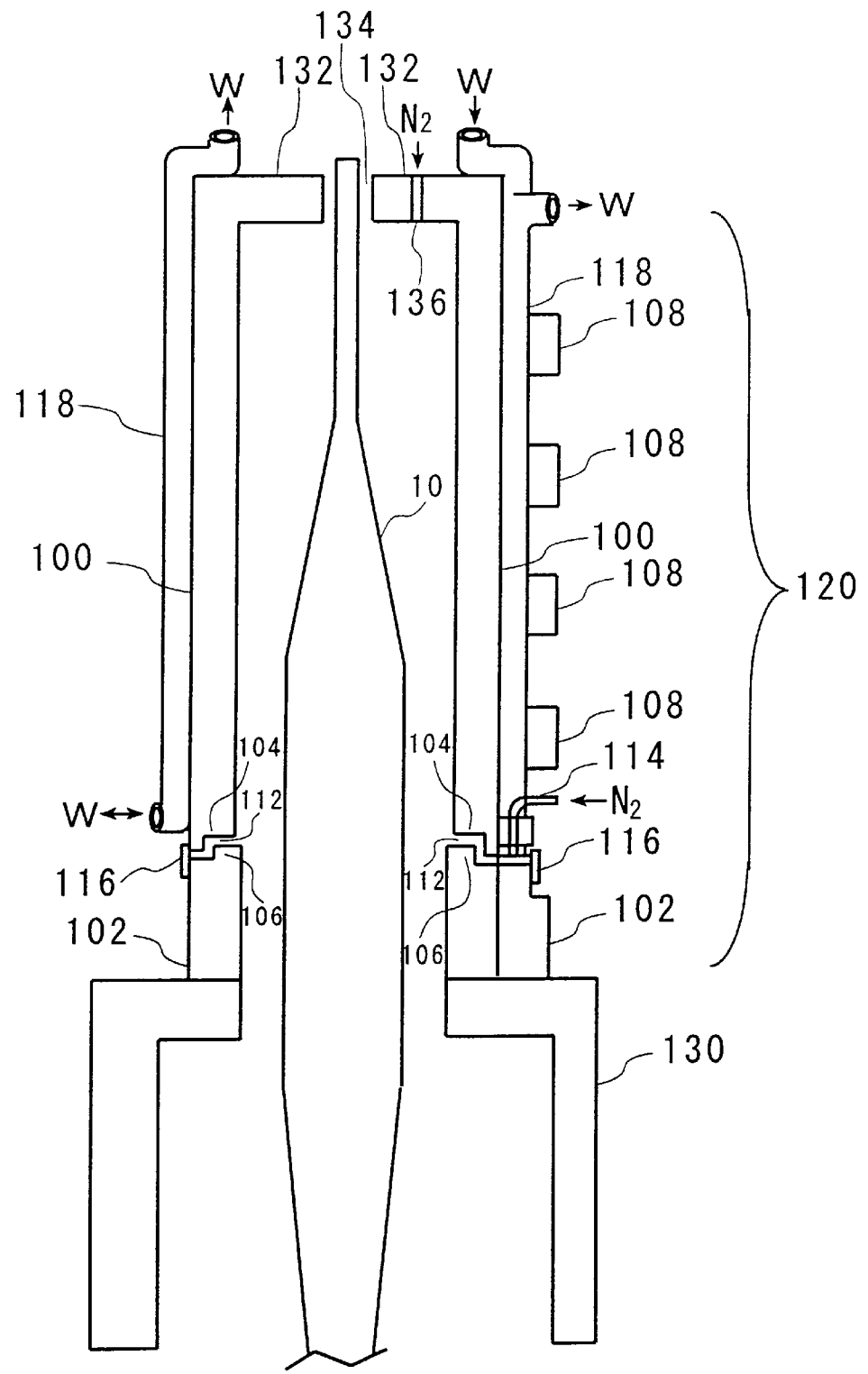
FIG. 8 shows a cross sectional view of the storage unit shown in FIG. 7.

FIG. 8 shows a cross sectional view of the storage unit 120 shown in FIG. 7. The opening unit 100 is vertically separated around the circumference of the storage unit 120 by the gap 112 from the sub-storage unit 102. The gap 112 is located between a bottom end 104 of the opening unit 100 and an upper end 106 of the sub-storage unit 102. The cross section of the bottom end 104 of the opening unit 100 is stepped in shape. The cross section of the upper end 106 of the sub-storage unit 102 is also stepped in shape.

Nitrogen gas is introduced into the gap 112 from a nitrogen gas inlet 114. The nitrogen gas inlet 114 is located in the vicinity of the hinges 108. The storage unit 120 may have a plurality of gas inlets 114 that are located with equal spacing around the circumference of the storage unit 120 so that nitrogen gas can be introduced into the gap 112 substantially uniformly from all sides of the gap 112. Nitrogen gas is also introduced into the interior of the storage unit 120 from a nitrogen gas inlet 136 provided on the end surface 132 of the opening unit 100. A belt is fixed around the outside surface of the storage unit 120 to surround the outside of storage unit 120 and close the gap 112.

There is a gap 112 between the bottom end 104 of the opening unit 100 and the upper end 106 of the sub-storage unit 102. Therefore, no friction occurs between the bottom end 104 of the opening unit 100 arid the upper end 106 of the sub-storage unit 102 when opening and closing the opening unit 100. The gap 112 is efficiently used as an inlet for nitrogen gas. The nitrogen gas can be introduced into the interior of the storage unit 120 substantially uniformly from all sides of the gap 112 when a plurality of the gas inlets 14 are located with equal spacing around the circumference of the storage unit 120. Furthermore, because the nitrogen gas inlet 114 is located in the vicinity of the hinges 108, the amount of movement of the hose connected to the nitrogen gas inlet 114 is kept to a minimum to prevent the hose disconnecting from the nitrogen gas inlet 114 during opening and closing of the opening unit 100.

Furthermore, each of the cross section views of the bottom end 104 of each of the sub-opening units 100A and 100B and the cross section of the upper end of the sub-storage unit 102 is stepped in shape. Therefore, the nitrogen gas introduced from the gas inlet 114 into the interior of the storage unit 120 has difficulty escaping from the storage unit 120. Moreover, the belt 116 encloses the gap 112 to prevent the nitrogen gas introduced from the gas inlet 114 to escape from the storage unit 120.

A coolant inlet of the cooling jacket 118 is provided on each of the ends of the cooling jacket 118. Each of the sub-opening units 100A and 100B has a cooling jacket 118, through which coolant flows for cooling the opening unit 100. A coolant inlet of the cooling jacket 118 is located in the vicinity of the hinges 118 on each end of the cooling jacket 118. Because the inlet of the cooling jacket 118 is located in the vicinity of the hinges 108, the amount of movement of the hose connected to the inlet of the cooling jacket 118 is kept to a minimum during opening and closing of the opening unit 100. Therefore, disconnection of the hose from the inlet of the cooling jacket 118 can be prevented. However, the coolant inlet can also be located on the opposite side of the hinges 118 as shown in FIG. 8.

Figure 9A:
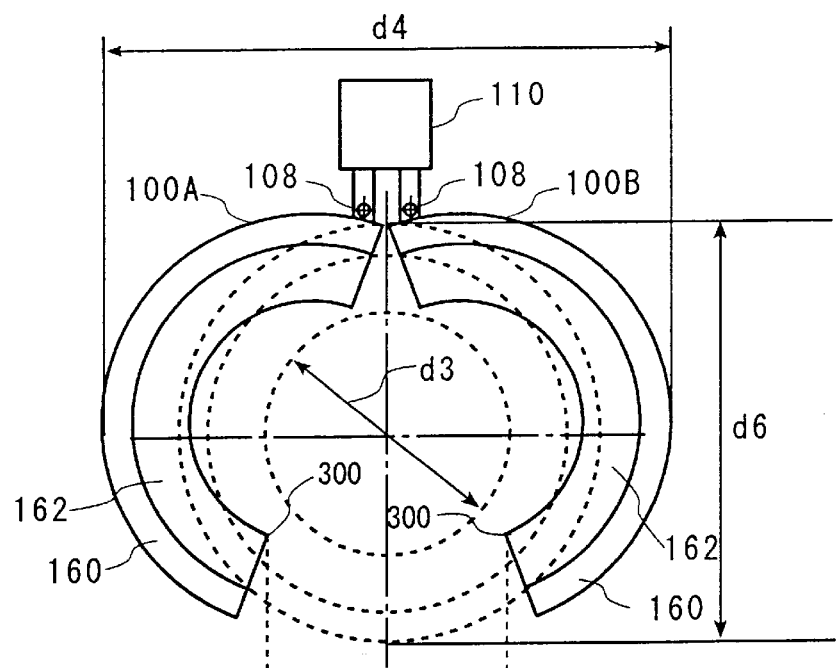
FIG. 9A is a view of the opening unit in open and closed positions.

FIG. 9A is a plan view of the opening unit 100 showing the opening unit 100 in open and closed positions. For simplification, the cooling jacket 118 and the nitrogen gas inlet 114 are not shown in FIG. 9A and FIG. 9B. Because one side of the sub-opening unit 100A and 100B is connected to the hinges 108, the other side of the sub-opening unit 100A and 100B moves away in a substantially symmetrical direction from the opposite sub-opening unit 100A or 100B such that the opening unit 100 opens in an outward direction when opening the opening unit 100.

The glass base rod 10 is moved from a side direction of the opened part of storage unit 100 into the interior of the storage unit 100 as shown by the arrow. Each of the sub-opening units 100A and 100B has a heat insulating material 162, which is provided inside the sub-opening units 100A and 100B, and a casing 160 surrounds the heat insulating material 162.

Figure 9B:
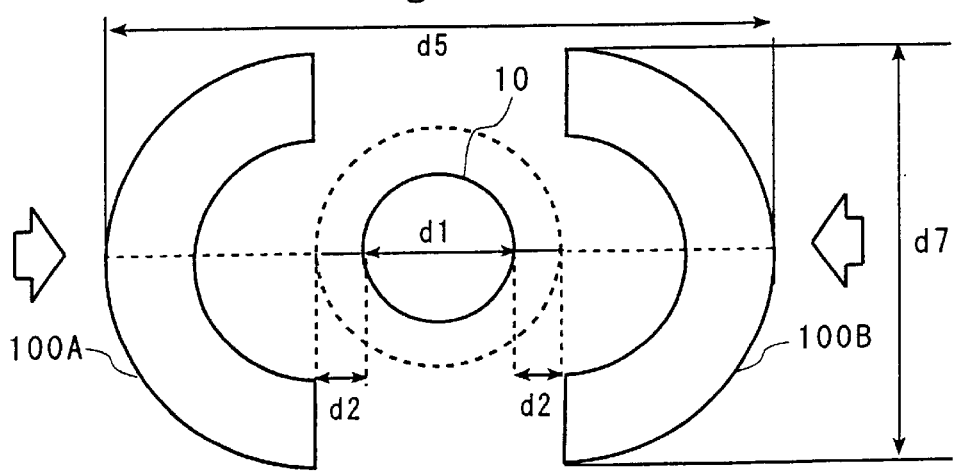
FIG. 9B shows a comparative example of the storage unit in which two sub-opening units move in opposite directions from each other.

In FIG. 9A and FIG. 9B, an opening unit 100 having an outside diameter d6 of 460 mm, and an inside diameter d3 of 270 mm is used as an example. The glass base rod 10 has a diameter d1 of 160 mm as an example. When the opening unit 100 is opened to store the glass base rod 10, a space d2 of 50 mm is created between the end point 300 of the inside surface of the opening unit 100 and the glass base rod 10. When the opening unit 100 is opened, the maximum width d4 between each of the outside faces of the sub-opening unit 100A and 100B for storing the glass base rod 10 is substantially 630 mm in case of the opening unit 100 shown in FIG. 9A.

Even though the end surface 132, not shown in FIG. 9A and FIG. 9B, is provided on the top surface of the opening unit 100, the width d4 of 630 mm is enough for storing the glass base rod 10 in the storage unit 120 because the glass base rod 10 is installed from the side direction of the storage unit 120.

FIG. 9B shows a comparative example of the storage unit 120 in which the two sub-opening units 100A and 100B move in opposite directions from each other. The outside diameter d6 and the inside diameter d3 of the storage unit 120 shown in FIG. 9B is the same as the outside diameter d6 and the inside diameter d3 of the storage unit 120 of FIG. 9A. In FIG. 9B, the width d5 between each of the outer faces of the sub-opening unit 100A and 100B is substantially 720 mm when the opening unit 100 is in the open position for installing the glass base rod 10 inside the storage unit 120. In this case, the width d5 of 720 mm is necessary for installing the glass base rod 10 into the storage unit 120.

Therefore, the embodiment shown in FIG. 9A occupies less space than the embodiment shown in FIG. 9B when the opening unit 100 is in the open position. Thus, the storage unit 120, in which hinges 108 couples the sub-opening units 100A and 100B, has preference to be used for the glass base rod drawing apparatus.

FIG. 10 to FIG. 13 show a procedure of drawing the glass base rod 10 using the glass base rod drawing apparatus of the present embodiment shown in FIG. 6 and FIG. 7. FIG. 10A and 10B show the procedure before moving the glass base rod 10 inside the storage unit 120. FIG. 10A shows a side view of the glass base rod drawing apparatus. FIG. 10B shows a front view of the glass base rod drawing apparatus.

Figures 10A, 10B:
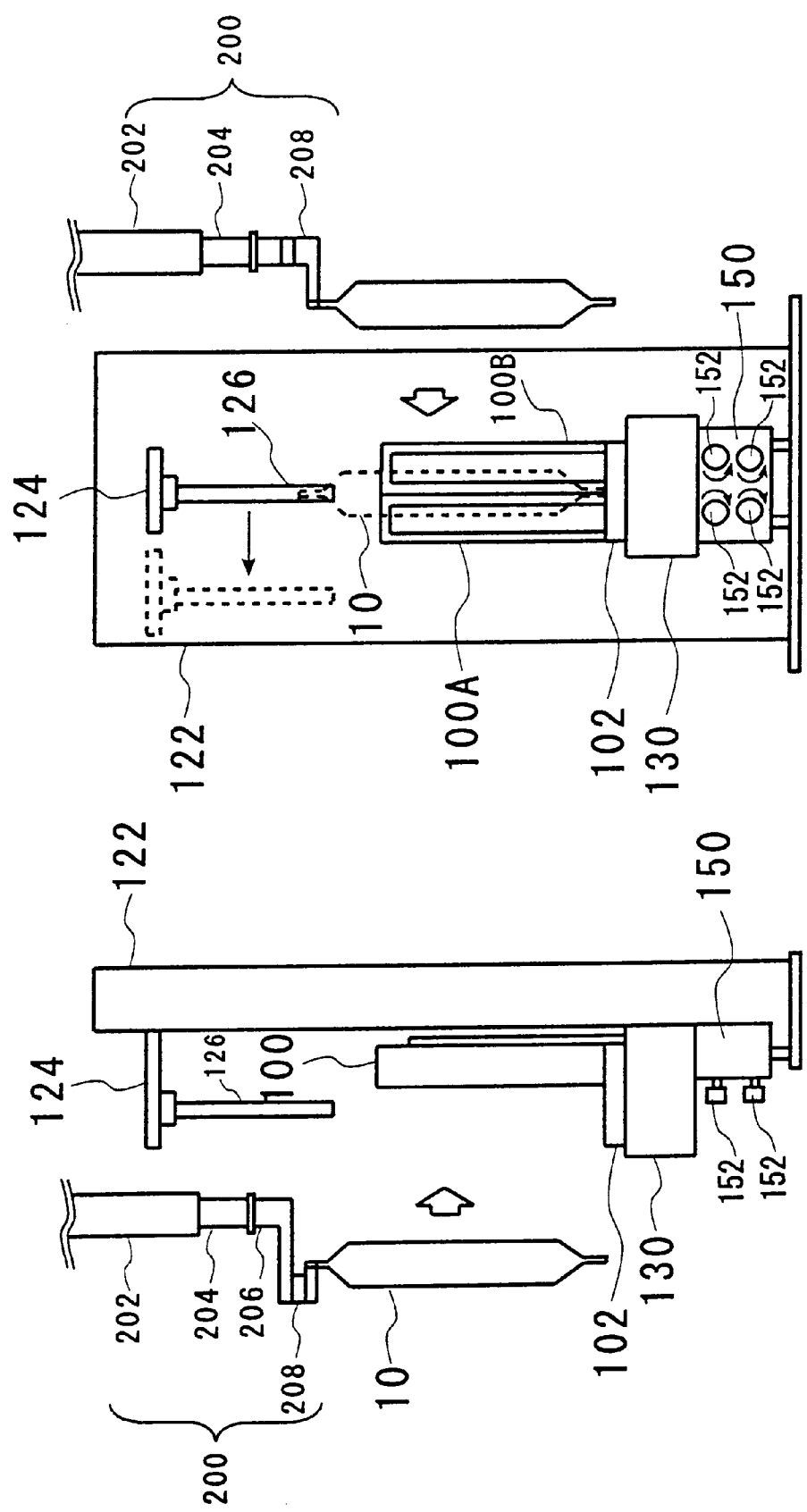
FIG. 10A shows a side view of a glass base rod drawing apparatus.
FIG. 10B shows a front view of a glass base rod drawing apparatus.

First, as shown in FIGS. 10A and 10B, the opening unit 100 is manually opened to receive the glass base rod 10. Then, the supply mechanism 124 moves the main shaft 126 laterally away from a substantially central position of the storage unit 120 as shown in FIG. 10B. The total length of the glass base rod 10 is longer than the distance between the bottom end of the main shaft 126 and the bottom end of the opening unit 100 when the main shaft 126 is located in the top position. Therefore, the main shaft 126 must be moved in a horizontal direction away from a substantially central position of the storage unit 120 to create space for installing the glass base rod to the substantially central position of the storage unit 120.

The arm 200 supports the glass base rod 10 and transfers the glass base rod 10 into the storage unit 120. The arm 200 has a support arm 202, an expansion arm 204, a first rotation arm 206, and a second rotation arm 206. The upper end of a support arm 202 is connected to the crane, such as an overhead traveling crane, not shown in the figure. The crane, not shown in the figure, transports the arm 200 in the vicinity of the storage unit 100. The arm 200 then transfers the glass base rod 10 inside the storage unit 100. The support arm 202 supports the other parts of the arm 200 and the glass base rod 10. The functions of the other parts including the extension arm 204, the first rotation arm 206, and the second rotation arm 208 are described further with reference to in FIG. 11.

Figure 11:
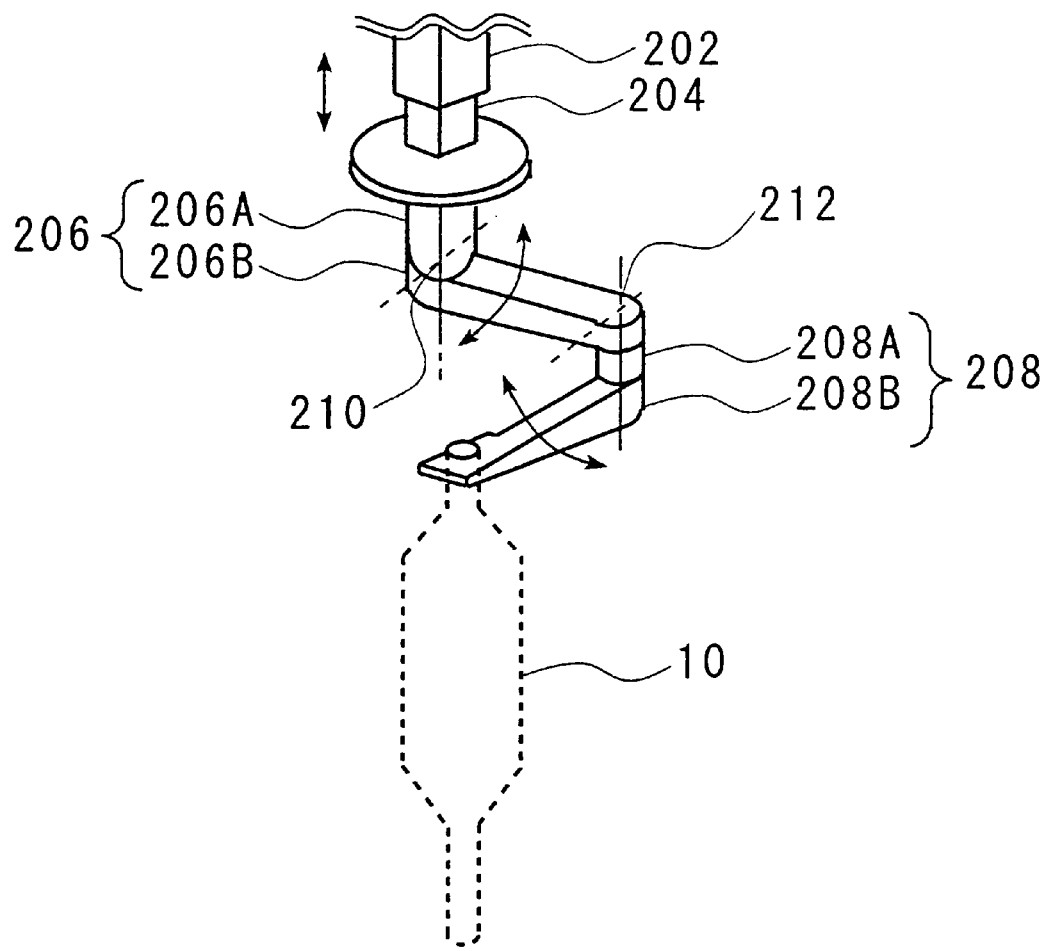
FIG. 11 shows a view of the arm shown in FIG. 10A and FIG. 10B.

FIG. 11 shows a perspective view of the arm 200. The extension arm 204 is provided inside the support arm 202 such that the extension arm 204 can move upward and downward inside the support arm 202. Therefore, the extension arm 204 can adjust the vertical position of the glass base rod, which is held by the second rotation arm 208. The first rotation arm 206 is connected to the extension arm 204. The first rotation arm 206 has a first shaft 206A and a first arm 206B. One end of the first shaft 206B is connected to the first shaft 206A. The other end of the first arm 206B is connected to the second shaft 208A of the second rotation arm 208. The first arm 206B rotates together with the first shaft 206A in a horizontal direction around the first rotation axis 210, which is a center of the first shaft 206A, as a center of rotation.

The second rotation arm 208 has a second shaft 208A and a second arm 208B. One end of the second arm 208B is connected to the second shaft 208A. The other end of the second arm 208B holds the glass base rod 10. The first arm 208B rotates together with the first shaft 208A in a horizontal direction around the second rotation axis 212, which is a center of the first shaft 208A, as a center of rotation. Therefore, the first rotation arm 206 and the second rotation arm 208 can more the glass base rod 10 in a horizontal direction to adjust the horizontal position of the glass base rod 10.

FIGS. 12A and 12B show the drawing procedure when the glass base rod 10 is moved inside the storage unit 120. FIG. 12A shows a side view of the glass base rod drawing apparatus. FIG. 12B shows a front view of the glass base rod drawing apparatus.

In FIGS. 12A and 12B, the glass base rod 10 is vertically oriented along the longitudinal axis of the glass base rod 10 and is installed into an interior of the opening unit 100 of the storage unit 120. The second rotation arm 208 of the arm 200 holds the glass base rod 10. The arm 200 mores the glass base rod 10 from a side direction of the opening unit 100 of the storage unit 120 into the interior of the storage unit 120. The arm 200 moves the glass base rod 10 by rotating the first rotation arm 206 and the second rotation arm 208.

The arm 200 then lowers the glass base rod 10 temporally into a heating unit 130 without heating the glass base rod 10 in order to create space for moving the main shaft 126 back. The arm 200 lowers the glass base rod 10 by moving the extension arm 204 downward. The supply mechanism 124 then moves the main shaft 126 back to the substantially central position of the storage unit 120 as shown in FIG. 12B.

FIGS. 13A to 13C show the drawing procedure after the main shaft 124 is moved back to the original position. Each of FIG. 13A to FIG. 13C show a side view of the glass base rod drawing apparatus.

In FIG. 13A, the glass base rod 10 is separated from the arm 200 and connected onto the bottom end of the main shaft 126. The supply mechanism 124 lowers the main shaft 126 that holds the glass base rod 10 into the interior of the sub-storage unit 102. The main shaft 126 is lowered until the top end of the glass base rod 10 becomes lower than the height of the end surface 132 of the opening unit 100 so that the opening unit 100 can be closed.

Then, as shown in FIG. 13B, the opening unit 100 is manually closed by moving one side, which is not coupled by the hinges 108, of each of the sub-opening units 100A, to close onto each other. Because the penetration hole 134 is located on the end surface of the opening unit 100, the main shaft is contained inside the penetration hole 134 when the opening unit 100 is closed. Next, the belt 116 is fixed on the outside surface of the storage unit 120. The belt 116 surrounds the storage unit 120 and encloses the gap 112.

Then, nitrogen gas is introduced inside the storage unit 120 from the nitrogen gas inlet 114 and 136 to replace the air inside the storage unit 120. Because the belt 116 encloses the gap 112, nitrogen gas cannot escape from the storage unit 120 via the gap 112. Nitrogen gas is introduced into the storage unit 120 until the end of the drawing procedure.

Next, as shown in FIG. 13C, the supply mechanism 124 inserts the glass base rod 10 into the heating unit 130 to heat the glass base rod 10 by lowering the main shaft 126. The heating unit 130 then heats the lower end portion of the glass base rod 10 that was inserted into the storage unit by the supply mechanism 124. Then, the extraction unit 150 extracts the glass base rod that has been heated by the heating unit 130 to reduce the diameter of the glass base rod 10 to produce a preform.

The coolant flows through the cooling jacket 118 to cool the storage unit 120 during heating and extraction of the glass base rod 10 for safety reasons. Because the opening unit 100 is manually opened after extracting the glass base rod 10, the opening unit 100, which is heated by the heat conducted from the heating unit 130, has to be cooled to prevent injury from burning.

Figure 1:
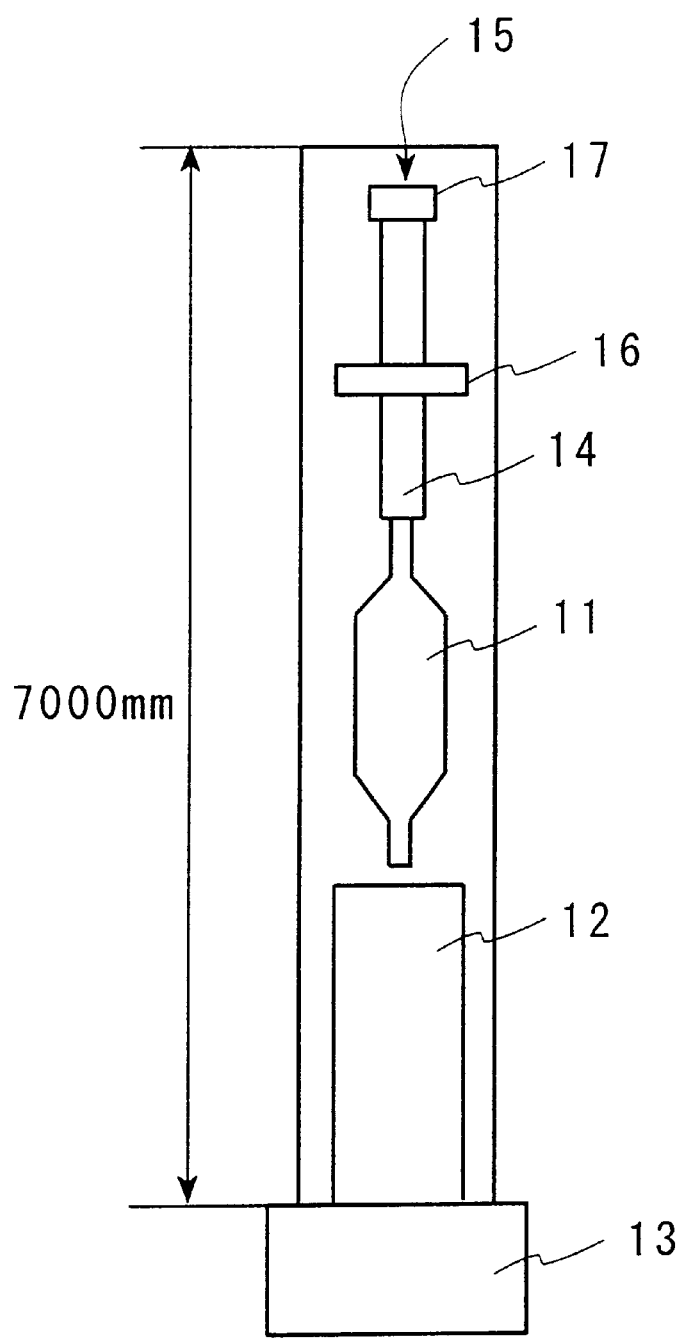
FIG. 1 is a schematic view of the neighborhood of a heating furnace of a conventional glass base material drawing apparatus.

As shown in FIG. 10 to FIG. 13, the supply mechanism 124 can horizontally move the main shaft 126 from a substantially central position of the storage unit 10 during installation of the glass base rod 10 into the interior of the storage unit 120. Therefore, the height from the top of the frame 122 to the bottom end of the storage unit 120 can be reduced to substantially five meters. The height from the top of the frame 122 to the bottom end of the storage unit 120 of the conventional glass base rod drawing apparatus is substantially seven meters as shown in FIG. 1. Thus, the present embodiment can reduce the total height of the frame 122 by approximately two meters. As a result, the moving distance of the glass base rod 10 can be reduced when installing the glass base rod 10 into the glass base rod drawing apparatus.

Furthermore, the opening unit 100 can be opened so as to install the glass base rod 10 into the storage unit 120 by moving the glass base rod 10 from a side direction of the storage unit 120 into an interior of the storage unit 120. Therefore, the height from the bottom end of the main shaft 126 to the bottom end of the opening unit 100 can be reduced. As a result, the moving distance of the glass base rod 10 can be reduced when installing the glass base rod 10 into the glass base rod drawing apparatus.

Figure 14B:
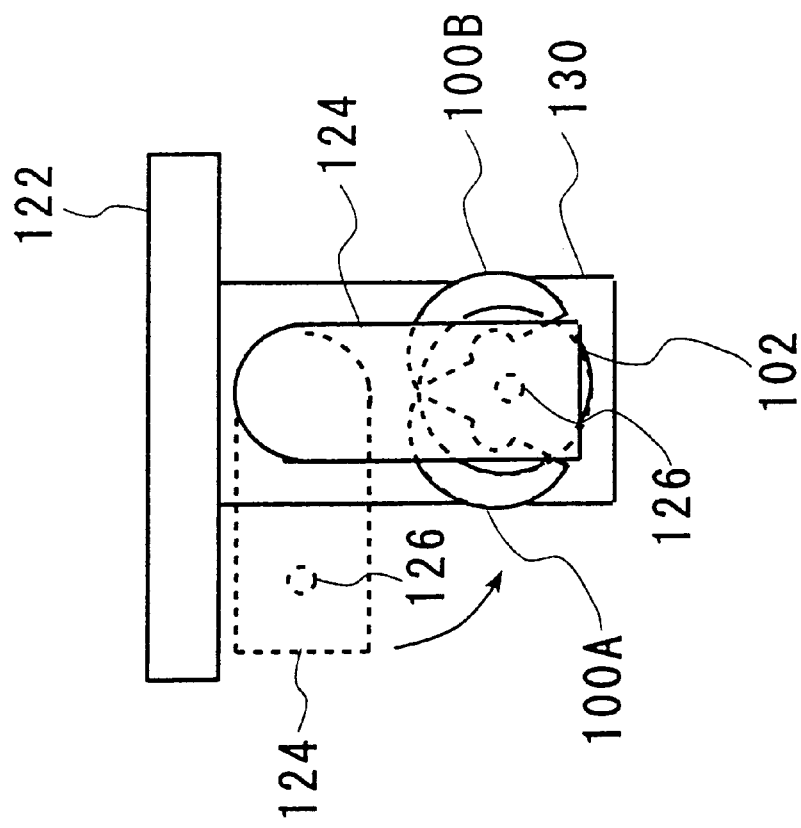
FIG. 14A and FIG. 14B show another embodiment of the glass base rod drawing apparatus according to the present invention.
Figure 14A:
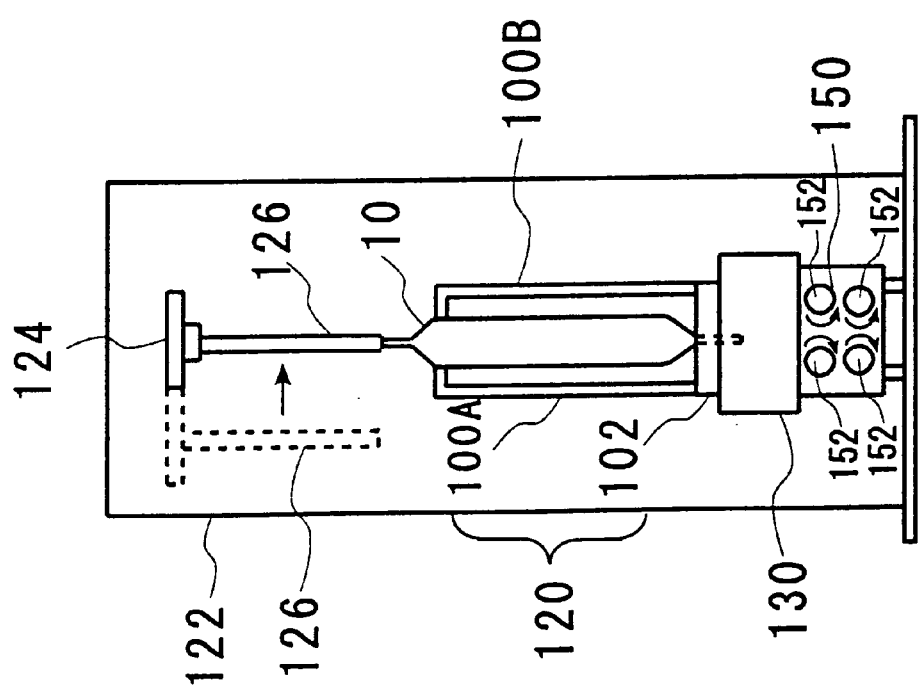

FIG. 14A and FIG. 14B show a further another embodiment of the glass base rod drawing apparatus. FIG. 14A shows a front view of the glass base rod drawing apparatus. FIG. 14B shows a plan view of the glass base rod drawing apparatus. As shown in FIG. 14A and FIG. 14B, the glass base rod drawing apparatus can rotate the supply mechanism 124 in a horizontal direction in relation to a substantially central position of the storage unit 120. Therefore, the glass base rod drawing apparatus can move the main shaft 126 away from a substantially central position of the storage unit.

According to the present embodiment, the total height of the glass base rod drawing apparatus can be reduced. As a result, the moving distance of the glass base rod 10 can be reduced when installing the glass base rod 10 into the glass base rod drawing apparatus. Therefore, the present embodiment can improve the operation efficiency of the drawing apparatus.

Next, an example of the present invention will be explained.

EXAMPLE

A cylindrical glass base material storage container 12, which has a diameter of 210 mm and a height of 1800 mm and is divided into two parts coupled by hinges 30 as shown in FIG. 2, was prepared. This storage container 12 was installed on a glass base material drawing apparatus having a heating furnace 13, a supply mechanism 17, and a pull-out mechanism 6 as shown in FIG. 3.

A glass rod having a diameter of 150 mm and a length of 2500 mm was installed as a glass base material 11 on this glass base material drawing apparatus. The glass base material 11 can be drawn if the length of the main axis 14 is 2000 mm. Taking this length and the length 2500 mm of the glass base material 11 into consideration, the length of the frame 15 of the drawing apparatus measured from the top surface of the heating furnace 13 to the top surface of the frame 15 turned out to be about 5 m.

COMPARATIVE EXAMPLE

Figure 3:
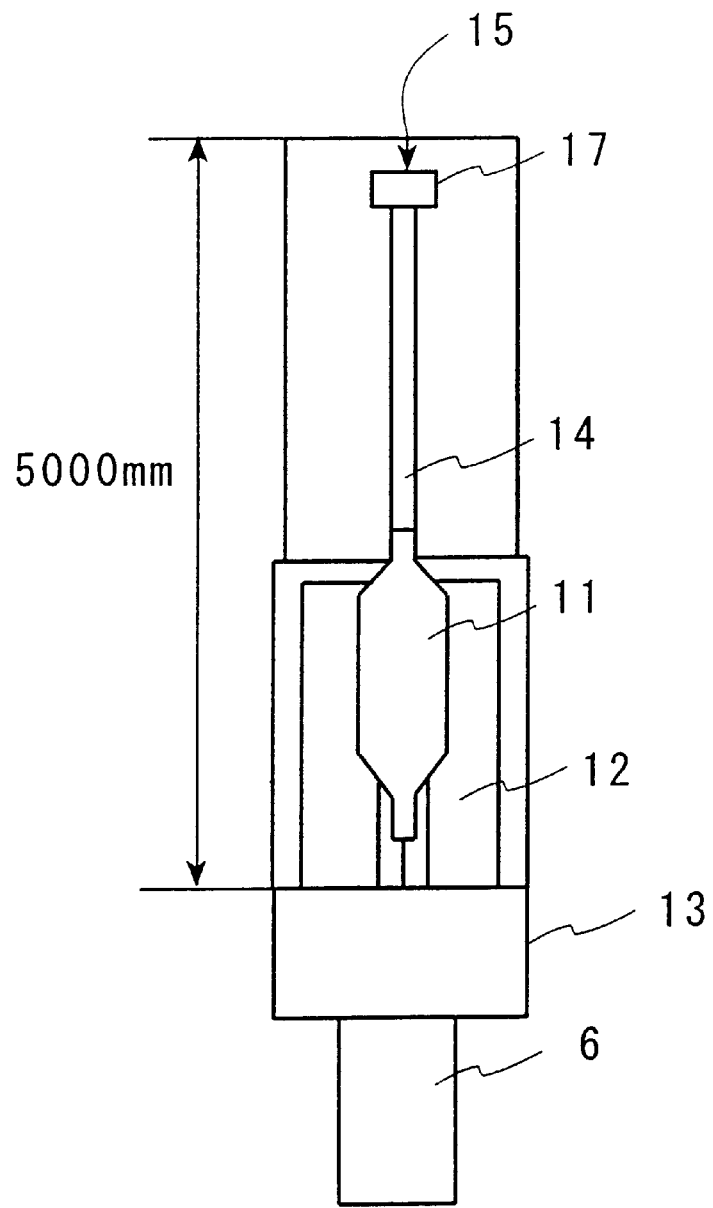
FIG. 3 is a schematic view of the neighborhood of a heating furnace of a glass base material drawing apparatus according to the present invention when the storing container is opened.
Figure 4:
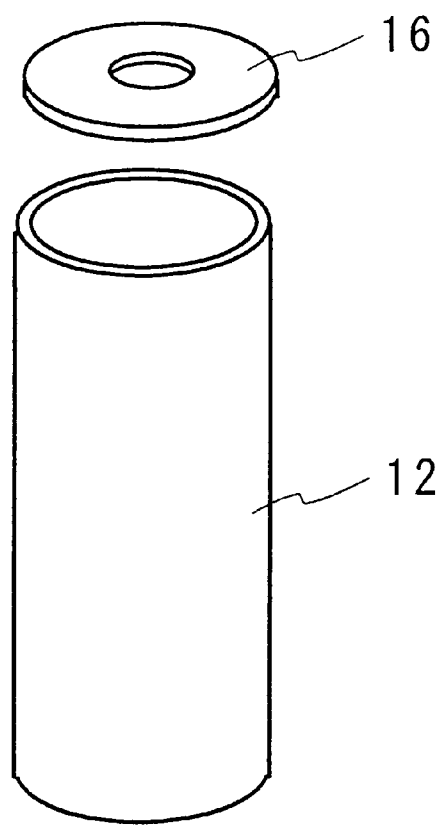
FIG. 4 is an oblique view of a conventional storing container.

Except that the conventional storage container shown in FIG. 3 was used, a glass base material drawing apparatus was constructed in the same manner as in the above-described embodiment (see FIG. 4).

A length of approximately 2000 mm was needed for the height of the storage container 12 as well as for the length of the main axis 14. Combining these lengths with the length of the glass base material 11, a length of approximately 7 m was needed for the length of the frame 15 of the drawing apparatus in the direction of the axis before the glass base material 11 was placed in the heating furnace 13. The refuge shift length of the glass base material 11 when the glass base material 11 was installed turned out to be 2000 mm.

According to the present invention, the glass base material does not need to be shifted upward in the axial direction to give refuge to the storage container. Therefore, the shift length of the glass base material in installing the glass base material on the drawing apparatus is reduced. As a result, the glass base material can be installed more easily, and the overall size of the drawing apparatus is also reduced.

We claim:

1. A glass base rod drawing apparatus for heating and drawing a glass base rod, comprising:

a storage unit for storing said glass base rod, the longitudinal axis of which is vertically aligned, said storage unit having an opening unit for placing said glass base rod inside said storage unit and a sub-storage unit provided below said opening unit, said opening unit being opened along a longitudinal and vertical direction of said storage unit when said glass base rod is placed inside said storage unit;

a heating unit for heating a lower end portion of said glass base rod that has been stored inside said storage unit via said opening unit;

an extraction unit for extracting said glass base rod heated by said heating unit; and wherein said storage unit has a gap between a bottom end of said opening unit and said sub-storage unit.

2. A glass base rod drawing apparatus as claimed in claim 1, wherein said opening unit is vertically separated around circumference of said storage unit by said gap from said sub-storage unit.

3. A glass base rod drawing apparatus as claimed in claim 2, further comprising a gas inlet for introducing gas into said gap.

4. A glass base rod drawing apparatus as claimed in claim 1, further has a belt that encloses said gap from outside said storage unit.

5. A glass base rod drawing apparatus as claimed in claim 1, wherein said opening unit has a cooling jacket, through which coolant flows for cooling said opening unit.

6. A glass base rod drawing apparatus as claimed in claim 1, wherein said opening unit is opened so as to install said glass base rod into said storage unit by moving said glass base rod from a side direction of said storage unit into an interior of said storage unit.

7. A glass base rod drawing apparatus as claimed in claim 1, further comprises:

a supply mechanism for supplying said glass base rod to said storage unit; wherein said supply mechanism includes a main shaft for supporting said glass base rod, said main shaft is connected to said glass base rod, and said opening unit has a penetration hole through which said main shaft passes while said opening unit is closed.

8. A glass base rod drawing apparatus as claimed in claim 7, wherein said supply mechanism has a mechanism for moving said main shaft in a horizontal direction in relation to a substantially central position of said storage unit.

9. A glass base rod drawing apparatus as claimed in claim 8, wherein said penetration hole defines at its boundary a circumference, and at least a portion of circumference is opened when said opening unit is opened.

10. A glass base rod drawing apparatus as claimed in claim 9, wherein:

said opening unit is pipe-shaped and has an end surface formed on a top surface of said opening unit; and said penetration hole is formed at a center of said end surface of said opening unit.

11. A glass base rod drawing apparatus as claimed in claim 10, wherein said opening unit is cylinder-shaped.

12. A glass base rod drawing apparatus as claimed in claim 11, wherein said opening unit is divisible into at least two sub-opening units along an axis of said storage unit and said opening unit is opened by moving at least one of said sub-opening units away from other said sub-opening units.

13. A glass base rod drawing apparatus as claimed in claim 12, wherein each of said sub-opening units has a cooling jacket, through which coolant flows for cooling said sub-opening unit.

14. A glass base rod drawing apparatus as claimed in claim 13, wherein said opening unit has hinges for coupling said at least two sub-opening units with each other.

15. A glass base rod drawing apparatus as claimed in claim 14, wherein each of said sub-opening units has a cooling jacket, through which coolant flows for cooling said opening unit; and an inlet of said coolant of said cooling jacket is located in vicinity of said hinges.

16. A glass base rod drawing apparatus as claimed in claim 14, wherein each of said sub-opening units has a gas inlet where gas is introduced into said gap; and said gas inlet is located in the vicinity of said hinges.

17. A glass base rod drawing apparatus as claimed in claim 13, wherein a cross section of said bottom end of each of said opening units is stepped in shape.

18. A glass base rod drawing apparatus as claimed in claim 12, wherein said opening unit is divisible into two sub-opening units by a plane that passes through said axis of said storage unit.

19. A glass base rod drawing apparatus for heating and drawing a glass base rod, comprising:
- a storage unit for storing said glass base rod whereby the longitudinal axis of said glass base rod is vertically aligned, said storage unit has an opening unit from which said glass base rod is placed inside said storage unit, and said opening unit being opened along a longitudinal direction and vertical direction of said storage unit when said glass base rod is placed inside said storage unit;
- a heating unit for heating a lower end portion of said glass base rod that has been stored inside said storage unit via said opening unit; and
- an extraction unit for extracting said glass base rod heated by said heating unit;
- a supply mechanism for supplying said glass base rod to said storage unit; wherein said supply mechanism includes a main shaft for supporting said glass base rod, and said main shaft is connected to said glass base rod, the axis of said main shaft is aligned onto the longitudinal axis of said glass base rod during heating and drawing said glass base rod; and
- a mechanism for moving said main shaft in a horizontal direction in relation to a substantially central position of said storage unit.

20. A method for heating and drawing a glass base rod, comprising:
- opening an upper part of a storage unit, which stores said glass base rod, along a longitudinal and vertical direction of said storage unit;
- moving a main shaft, which is to be connected to said glass base rod, in a horizontal direction in relation to a substantially central position of said storage unit;
- storing said glass base rod oriented vertically along the longitudinal axis of said glass base rod into an interior of said upper part of said storage unit;
- lowering said glass base rod into a lower part of said storage unit;
- moving said main shaft back to said substantially central position of said storage unit;
- connecting said glass base rod onto said main shaft;
- closing said upper part of said storage unit;
- inserting said glass base rod into a heating unit, which heats a lower end portion of said glass base rod, by lowering said main shaft;
- heating lower end portion of said glass base rod that was inserted into said storage unit by said inserting; and
- extracting said glass base rod that has been heated by said heating.

21. A method as claimed in claim 20, wherein said storing said glass base rod moves said glass base rod from a side direction of said upper part of storage unit into said interior of said storage unit.

22. A method as claimed in claim 21, wherein said closing said upper part of said storage unit contains said main shaft inside a penetration hole formed on said upper part of said storage unit.

23. A method as claimed in claim 21, wherein said storing said glass base rod moves said glass base rod from said side direction of said storage unit to substantially central position in a horizontal direction of said storage unit.

24. A method as claimed in claim 23, wherein said opening said upper part of said storage unit opens at least a portion of a circumference of said penetration hole.

25. A method as claimed in claim 24, wherein said storage unit is formed in a pipe-shape having an end surface formed on a top surface of said upper part of said storage unit; and
said storing said glass base rod installs said main shaft inside said penetration hole formed at a center of said end surface.

26. A method as claimed in claim 25, wherein said opening said upper part of said storage unit divides said upper part of said storage unit into at least two sub-opening units along an axis of said storage unit; and
said opening said upper part of said storage unit further moves at least one of said sub-opening units away from other said sub-opening units.

27. A method as claimed in claim 26, wherein said at least two sub-opening units are coupled with each other by hinges; and said opening said storage unit moves one side of one of said sub-opening units, which is not coupled to other said sub-opening units by said hinges, away from other said sub-opening units such that said opening units open in an outward direction.

28. A method as claimed in claim 26, wherein said dividing said upper part of said storage unit divides said upper part of said storage unit into said at least two sub-opening units by a plane passing through said axis of said storage unit.

29. A method as claimed in claim 20, wherein a gap is formed between a bottom end of said upper part of said storage unit and a top end of said lower part of said storage unit.

30. A method as claimed in claim 29, wherein said closing said upper part of said unit encloses said gap.

31. A method as claimed in claim 29, further comprising supplying gas from said gap.

32. A method as claimed in claim 31, wherein said supplying said gas supplies said gas from a gas inlet located in the vicinity of said hinges.

33. A glass base rod drawing method as claimed in claim 30, wherein said closing said upper part of said storage unit further encloses said gap by a belt.

34. A glass base rod drawing method as claimed in claim 27, further comprising cooling said sub-opening units by a coolant which flows through a cooling jacket provided on each surface of said sub-opening units.

35. A glass base rod drawing method as claimed in claim 34, wherein said cooling said sub-opening units supplies said coolant from a coolant inlet provided in the vicinity of said hinges.

36. A glass base rod drawing method as claimed in claim 29, wherein said bottom end of said upper part of said storage unit is formed in a stepped shape.

37. A glass base rod drawing method as claimed in claim 20, wherein said moving said main shaft rotates said main shaft in horizontal direction in relation to a substantially central position of said storage unit.

38. A glass base rod drawing method as claimed in claim 23, wherein said storing said glass base rod moves said glass base rod by rotating said glass base rod in horizontal direction in relation to a substantially central position of said storage unit.

* * * * *